United States Patent [19]
Ehlert

[11] 3,862,623
[45] Jan. 28, 1975

[54] ROTARY ENGINE

[76] Inventor: Clarence W. Ehlert, 1301 Main St., Concordia, Mo. 64020

[22] Filed: Nov. 19, 1973

[21] Appl. No.: 417,392

[52] U.S. Cl. ............... 123/8.35, 123/8.41, 418/195
[51] Int. Cl. ............................................. F02b 53/08
[58] Field of Search .......... 418/195; 123/8.23, 8.35, 123/8.41

[56] References Cited
UNITED STATES PATENTS
3,221,717  12/1965  Renshaw........................ 418/195 X

*Primary Examiner*—C. J. Husar
*Assistant Examiner*—Leonard Smith
*Attorney, Agent, or Firm*—Fishburn, Gold & Litman

[57] ABSTRACT

A rotary internal combustion engine includes a stationary housing having a rotor rotatably mounted therein which has a fuel receiving channel and a combustion channel laterally spaced therefrom in the peripheral surface of the rotor. Each of the channels extend circumferentially around the rotor and have a respective plurality of circumferentially spaced partitions therein adapted to divide the respective channel into sections. Blocking members each extend into a respective one of the sections of each of the channels and cooperate with the partitions therein to divide each of the sections of the fuel receiving channel into a fuel intake portion and a fuel compression portion and to divide each of the sections of the combustion channel into an ignition portion and an exhaust portion and to respectively effect compression of fuel and exhaust of combusted fuel in response to rotation of the rotor as effected by ignition of fuel in the ignition portion of each of the sections of the combustion channel.

9 Claims, 7 Drawing Figures

ROTARY ENGINE

The present invention relates to new and useful improvements in rotary engines and more particularly to a rotary internal combustion engine wherein all moving parts thereof are mounted for rotation.

The principal objects of the present invention are: to provide a rotary internal combustion engine adapted for construction in a wide range of sizes, such as from lawn-mower size to twenty-five feet in diameter or larger; to provide such a rotary engine which provides substantially improved combustion of fuel for economy of fuel and for substantially less pollution of the air than conventional engines; to provide such a rotary engine characterized by absence of moving parts which start and stop, such as pistons, connecting rods, and the like; to provide such a rotary internal combustion engine wherein all of the moving parts of the engine rotate thereby substantially increasing energy delivered from fuel; to provide such a rotary engine of substantially decreased size for equivalent horsepower delivered relative to conventional engines; to provide such a rotary internal combustion engine having a substantially increased number of firings or fuel ignitions per revolution of a rotor thereby providing a smooth operating engine; to provide such a rotary engine adapted for use with available auto fuel supply and exhaust systems; and to provide such a rotary engine which is particularly economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and includes an exemplary embodiment of the present invention and illustrated various objects and features of the rotary internal combustion engine.

Figure 1:
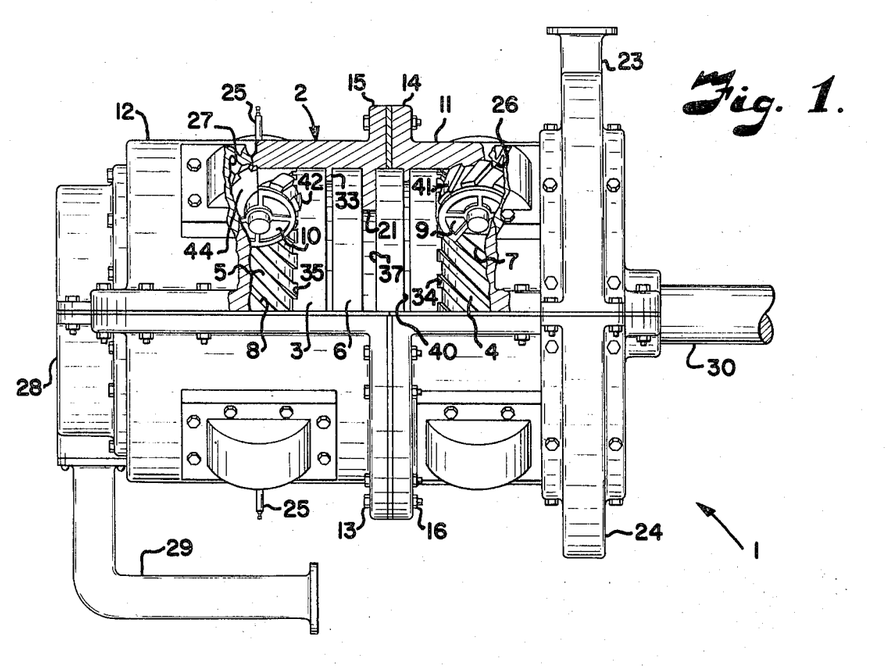
FIG. 1 is a side elevational view of a rotary internal combustion engine embodying features of the present invention and with portions broken away to better illustrate the component parts.
Figures 2, 4, 5:
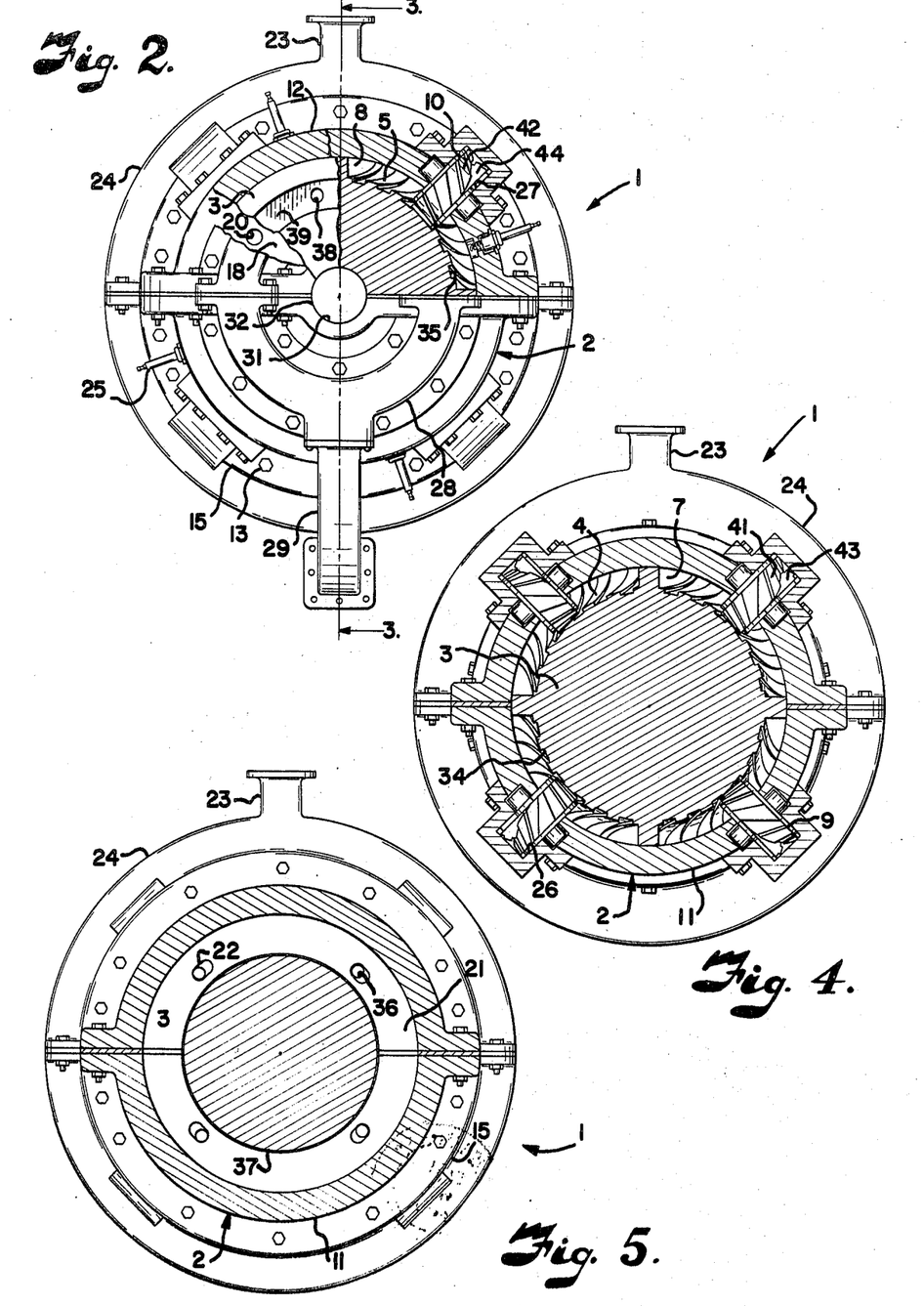
FIG. 2 is an end elevational view of the rotary engine and with portions broken away to better illustrate the component parts.
FIG. 4 is a transverse sectional view taken on line 4—4, FIG. 3 and showing a fuel receiving channel in a rotor and blocking members extending into same.
FIG. 5 is a transverse sectional view taken on line 5—5, FIG. 3 and showing valve means for controlling flow of fuel between the fuel receiving channel and a combustion channel.
Figure 3:
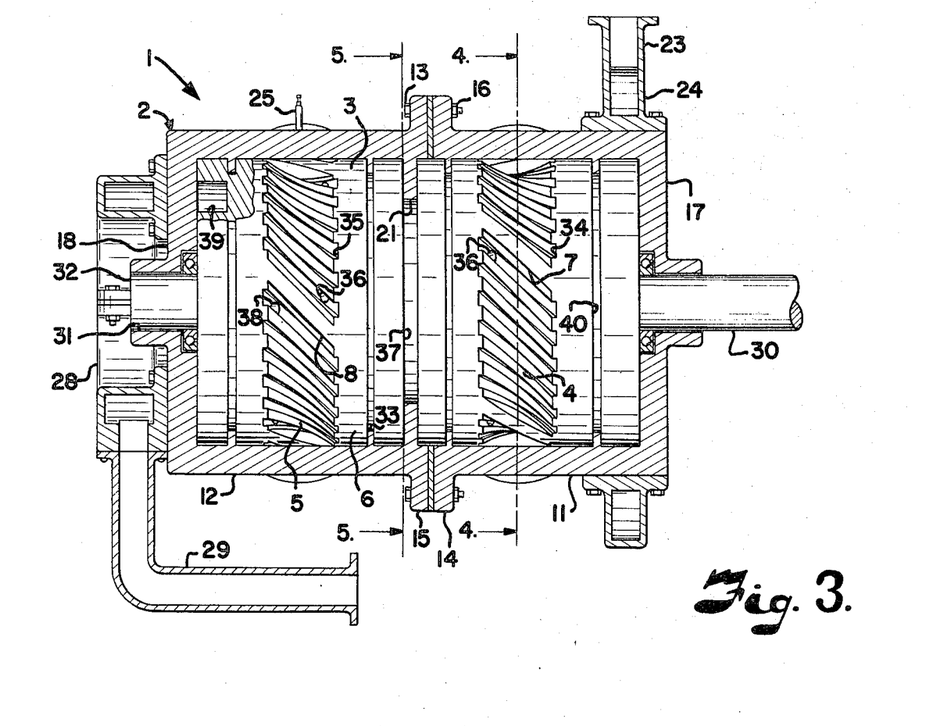
FIG. 3 is a longitudinal sectional view of the rotary engine taken on line 3—3, FIG. 2.
Figure 6:
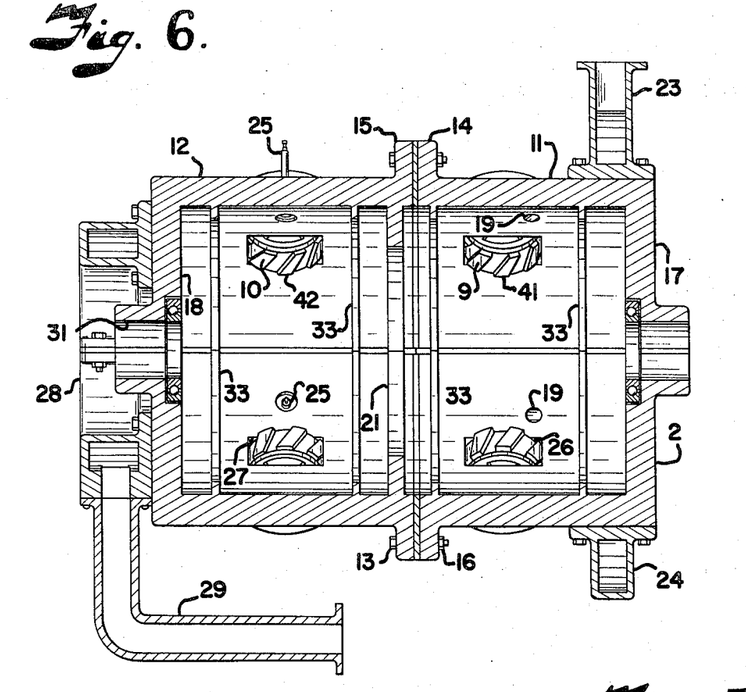
FIG. 6 is a fragmentary elevational view showing an inner surface of one stator wall.
Figure 7:
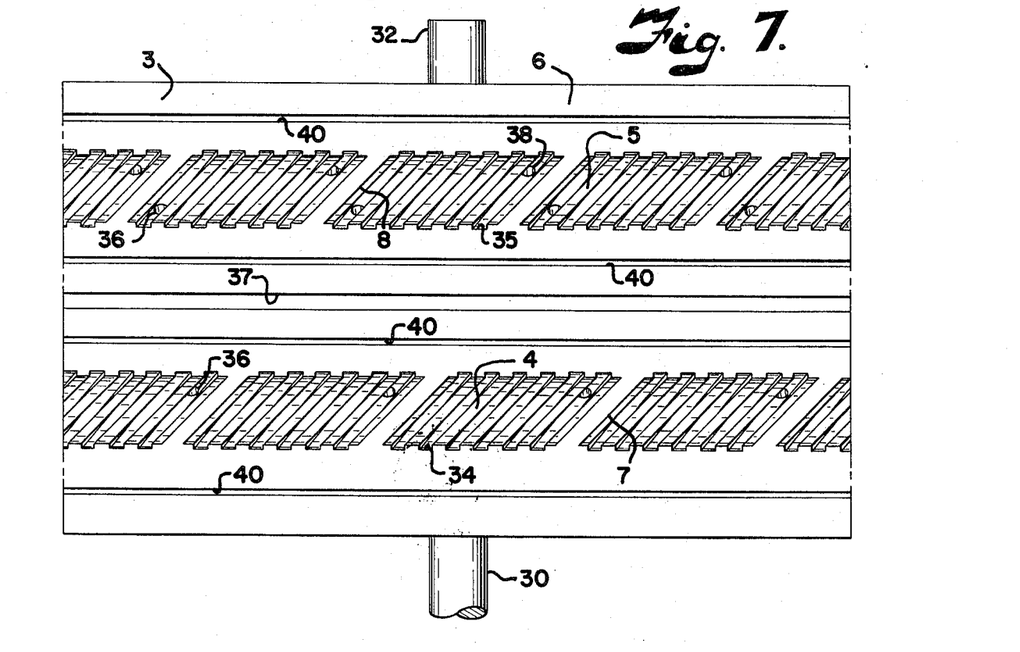
FIG. 7 is a developed view of the peripheral surface of the rotor.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a rotary internal combustion engine particularly adapted for use in automotive vehicles (not shown). The rotary engine 1 includes a stationary stator including a housing 2 having a rotor 3 rotatably mounted therein and the rotor 3 has a fuel receiving channel 4 and a combustion channel 5 laterally spaced from the fuel receiving channel 4 and positioned in the peripheral surface 6 of the rotor 3. The channels 4 and 5 extend circumferentially around the rotor 3 and have a plurality of circumferentially spaced partitions 7 and 8 respectively therein and the partitions 7 and 8 are adapted to divide the respective channels 4 and 5 into a plurality of circumferential sections. The partitions 7 define compression blades to effect compression of fuel in the channel 4 and the partitions 8 define piston members to effect turning of the rotor 3 and exhaust of combusted fuel, as later described. Blocking members 9 and 10 each extend into a respective one of the sections of each of the channels 4 and 5 and respectively cooperate with the partitions 7 in the fuel receiving channel 4 to divide each of the sections of the fuel receiving channel 4 into a fuel intake portion and a fuel compression portion and with the partitions 8 in the combustion channel 5 to divide each of the sections of the combustion channel 5 into an ignition portion and an exhaust portion. The blocking members 9 and the partitions 7 cooperate to compress fuel in the fuel compression portion of each of the sections of the fuel receiving channel 4 and the blocking members 10 and the partitions 8 cooperate to exhaust combusted fuel from the exhaust portion of each of the sections of the combustion channel 5, in response to rotation of the rotor 3 as effected by ignition of fuel in the ignition portion of each of the sections of the combustion channel 5.

The housing may be any suitable structure providing a stationary support for the rotor 3 during rotation thereof. In the illustrated structure, the housing 2 has a pair of facing generally annular stator walls 11 and 12 each having a generally cylindrical shape and being suitably secured together in fluid and gas tight relation adjacent the peripheral edges thereof, as by plurality of circumferentially spaced bolts 13 extending through peripheral edge flanges 14 and 15 respectively and having nuts 16 on the bolts 13 to hold the flanges 14 and 15 in clamped engagement. The illustrated stator walls 11 and 12 include opposite end walls 17 and 18 respectively positioned in facing relation when the stator walls 11 and 12 are secured together, the stator walls 11 and 12 and the end walls 17 and 18 each have respective inner surfaces which cooperate to define an inner chamber which is closed by the end walls 17 and 18.

One of the stator walls, for example stator wall 11, has a plurality of circumferentially aligned and spaced intake ports 19 therein, for a purpose later described. One of the end walls, for example end wall 18 of the other stator wall 12 has a plurality of spaced exhaust ports 20 therein, also for a purpose later described.

One of the stator walls, for example the other stator wall 12 has a valve fin 21 extending radially inwardly from the inner surface of the stator wall 12. The valve fin 21 has a plurality of circumferentially spaced ports 22 therethrough to permit flow of fuel between the fuel receiving channel 4 and the combustion channel 5, as by means later described.

The rotary engine 1 includes means mounted on the housing 2 for communicating fuel to each of the intake ports 19 in the stator wall 11 and thereby into the fuel receiving channel 4 in the rotor 3. In the illustrated structure, a fuel supply conduit 23 communicates with a source (not shown) of suitable fuel and with a suitable manifold 24 which surrounds a portion of the housing 2 and encloses the intake ports 19 in the stator wall 11. The intake ports 19 each may have a suitable valve member (not shown) therein to control flow from the manifold 24 into the fuel receiving channel 4.

Suitable fuel ignition means, such as a plurality of circumferentially spaced spark plugs 25, are mounted on the housing 2 and communicate with the combustion channel 5 in the rotor 3 to ignite fuel therein whereby the combustion of the fuel effects rotation of the rotor 3 by acting against the partitions 8 positioned in the combustion channel 5.

The stator walls 11 and 12 have a plurality of circumferentially spaced recesses 26 and 27 respectively therein and adapted to receive the valve members 9 and 10 respectively. The recesses 26 and 27 each have facing surfaces which each have suitable bearings therein for rotatably supporting respective opposite ends of trunions supporting the valve members 9 and 10.

The rotary engine 1 includes means mounted on the housing 2 for collecting exhaust through the exhaust ports 20 for flow to a suitable exhaust system (not shown). In the illustrated embodiment, a manifold 28 substantially surrounds the end wall 18 and the exhaust ports 20 therein. An exhaust conduit 29 communicates with the manifold 28 for conveying exhaust gases and combusted fuel from the rotary engine 1.

The housing 2 includes suitable means for rotatably mounting the rotor 3 within the inner chamber therein. In the illustrated embodiment, a power shaft 30 is operatively connected to the rotor 3, as by being integral therewith, and the power shaft 30 extends through at least one of the end walls of the housing 2, for example the end wall 17 of the stator wall 1. In the illustrated structure, the other end wall 18 has a suitable bore 31 formed therein. The bore 31 is positioned on the longitudinal axis of the housing 2 and is adapted to receive a longitudinally extending support shaft 32 in the rotor 3 and the bore 31 preferably has suitable bearings therein engaging the rotor 3 for rotatably supporting the rotor 3.

The housing 2 and the rotor 3 may be cooled in any suitable manner. In the illustrated embodiment, the stator walls 11 and 12 each have a plurality of longitudinally spaced cooling fins 33 extending radially inwardly from the inner surface thereof. The cooling fins 33 are received in longitudinally spaced recesses in the rotor 3, as later described, whereby heat is transferred from the rotor 3 to the housing 2.

The rotor 3 is rotatably mounted within the inner chamber of the housing 2 and has the peripheral surface 6 thereof in close proximity with the inner surface of the stator walls 11 and 12. The illustrated fuel receiving channel 4 and the combustion channel 5 are formed by wall means in the peripheral surface 6 of the rotor 3 and extend circumferentially around the rotor 3. The channels 4 and 5 are laterally spaced in the peripheral surface 6 and the fuel receiving channel 4 is in the longitudinal alignment with the intake ports 19 in the stator wall 11 whereby fuel may flow directly into each of a plurality of sections, as later described, in the fuel receiving channel 4.

The channels 4 and 5 are arcuate in shape and are illustrated as having a cross section defined by a portion of the circumference of a circle. The fuel receiving channel 4 and the combustion channel 5 have a plurality of spaced grooves 34 and 35 respectively in the walls defining the channels 4 and 5. The grooves 34 and 35 in the walls defining the channels 4 and 5 are each arranged in a spiral pattern, for a purpose later described.

The partitions 7 and 8 are circumferentially spaced on the peripheral surface 6 of the rotor 3 and are arranged in a pair of groups positioned in the channels 4 and 5 to respectively divide same into a plurality of sections. The number of sections in the channels 4 and 5 correspond to the number of intake ports 19 in the stator wall 11. The partitions 7 and 8 for the channels 4 and 5 respectively are each arranged in a spiral pattern corresponding to that of the grooves 34 and 35. The compression blades or partitions 7 cooperate with the blocking members 9 to effect compression of fuel received in sections of the fuel receiving channel 4, as later described, and the piston member or partitions 8 cooperate with the blocking members 10 to provide a surface or member against which the expanding fuel reacts during combustion thereof to cause rotation of the rotor 3.

The rotor 3 has a plurality of circumferentially spaced bores 36 each extending between a respective one of the sections of the fuel receiving channel 4 and a respective one of the sections of the combustion channel 5. The bores 36 each have an entrance positioned adjacent a forward or leading side of the respective compression blade or partition 7 in the fuel receiving channel 4 whereby the entrance to each of the bores 36 is positioned in the area of maximum compression of the fuel therein. The bores 36 each have an exit into the combustion channel 5 which is positioned adjacent a rear or trailing side of the respective piston member or partition 8 in the combustion channel member thereby defining an ignition area.

The rotor 3 has walls defining a recess 37 in the peripheral surface 6 thereof with the recess 37 intersecting each of the bores 36. The recess 37 receives the valve fin 21 therein with the valve fin 21 being sized to be in close proximity to the surfaces defining the recess 37. During rotation of the rotor 3, the ports 22 in the valve fin 21 are positioned to close the bores 36 after flow of fuel therethrough thereby preventing backfire into the fuel receiving channel 4 upon ignition of the fuel in each ignition area in the ignition and combustion channel 5.

The rotor 3 has a plurality of exhaust bores 38 each communicating with a respective one of the sections of the combustion channel 5 for permitting flow of the combusted fuel into the manifold 28. The exhaust bores 38 each have an entrance thereof positioned adjacent a forward or leading side of a respective one of the partitions 8 in the combustion channel 5. The exhaust bores 38 each extend between a respective section of the combustion channel 5 and a recess 39 formed in an end of the rotor 3. The recess 39 communicates with the exhaust ports 20 in the end wall 18 of the housing 2 which in turn each communicate with the manifold 28.

The housing 2 and the rotor 3 may be cooled in any suitable manner. In the illustrated embodiment, the peripheral surface 7 of the rotor 3 has a plurality of circumferentially extending and longitudinally spaced recesses 40 each adapted to receive a respective one of the cooling fins 33 therein to thereby maintain the rotor 3 within a desirable temperature range.

The blocking members 9 and 10 are each rotatably mounted on the housing and each extends into a respective one of the sections of the fuel receiving channel 4 and the combustion channel 5. The blocking members 9 cooperate with the partitions 7 in the fuel receiving channel 4 to divide each of the sections of the fuel receiving channel 4 into a fuel intake portion and a fuel compression portion. Each fuel intake portion is between the respective blocking member 9 and the rear or trailing side of one adjacent partition 7 and each fuel compression portion is between the respective blocking member 9 and the forward or leading side of an other adjacent partition 7.

The blocking members 10 cooperate with the partitions 8 in the combustion channel 5 to divide each of the sections of the combustion channel 5 into an ignition portion and an exhaust portion. Each ignition portion is between the respective blocking member 10 and the rear or trailing side of one adjacent partition 8 and each exhaust portion is between the respective blocking member 10 and the forward or leading side of an other adjacent partition 8..

In the illustrated structure, the blocking members 9 and 10 are circumferentially spaced and are mounted on suitable trunions mounted in the recesses 26 and 27 respectively whereby the blocking members 9 and 10 are rotatably mounted on the housing 2. The blocking members 9 and 10 are illustrated as generally planar members having spaced ridges 41 and 42 on peripheral edge surfaces of the blocking members 9 and 10 respectively. The ridges 41 and 42 are arranged in a spiral pattern corresponding to that of the grooves 34 and 35 respectively in the fuel receiving channel 4 and the combustion channel 5 and the ridges 41 and 42 are received in the grooves 34 and 35.

The ridges 41 and 42 and the grooves 34 and 35 provide cooperative means on the rotor 3 and the blocking members 9 and 10 for effecting relative movement between the blocking members 9 and 10 and the respective adjacent partitions 7 and 8 on the rotor 3 all in response to rotation of the rotor 3. The partitions 7 and 8 are moved toward respective adjacent blocking members 9 and 10 during rotation of the rotor 3. The blocking members 9 and 10 each have means for permitting each of the blocking members 9 and 10 to successively move over each of the respective partitions 7 and 8 on the rotor 3 whereby the partition 7 and 8 are each successively moved toward and by each of the respective blocking members 9 and 10 in the sections of the fuel receiving channel 4 and the combustion channel 5 respectively during rotation of the rotor 3.

In the illustrated embodiment, the blocking members 9 and 10 are generally planar disks and each have walls extending inwardly from the peripheral edge surface thereof to define paths 43 and 44 in the peripheral edge surface of the blocking members 9 and 10 respectively to successively receive therein each of the partitions 7 and 8. The paths 43 and 44 in the peripheral edge surface of the blocking members 9 and 10 are arranged in a corresponding spiral pattern to the position of the partitions 7 and 8 respectively.

Operation of a rotary engine constructed as illustrated and described includes turning the power shaft 30 by a suitable starter motor (not shown) whereby turning of the power shaft 30 effects turning of the rotor 3 and thereby flow of fuel through the intake ports 19 in the stator wall 11 and into each fuel intake portion of the sections of the fuel receiving channel 4, as by vacuum. Continued turning of the shaft 30 by the starter motor (not shown) moves the partitions 7 in the fuel receiving channel 4 towards the blocking members 9 extending into the channel 4 to reduce the size of the fuel compression portions of the sections of the fuel receiving channel 4 thereby compressing the fuel previously received in the sections of the fuel receiving channel 4. After each partition 7 moves by a respective blocking member 9, fuel flow into each fuel intake portion of the sections of the fuel receiving channel 4. The blocking members 9 force the compressed fuel to flow through the bores 36 when the valve fin 21 and the rotor 3 are positioned to have the ports 22 in the valve fin 21 aligned with the bores 36 thereby conveying fuel to the ignition portion of each of the sections of the combustion channel 5. The spark plugs 25 each ignite the fuel in a respective one of the ignition portions of the sections of the combustion channel 5 after the rotor 3 has moved sufficiently for the valve fin 21 to close the bores 36 thereby preventing backfire into the fuel receiving channel 4. The ignition and combustion of the fuel in the combustion channel 5 causes expansion gases which act against each of the partitions 8 extending into the channel 5 thereby turning the rotor 3. After the rotor 3 has turned the length of one of the sections of the ignition and combustion channel 5, the blocking members 10 effect exhaust of previously combusted fuel. After the blocking members 10 have one of the partitions 8 moved therethrough, the blocking members 10 enter the next successive section of the combustion channel 5 and ignition of fuel and combustion thereof is repeated.

While the fuel receiving channel 4 and the combustion channel 5 have been illustrated and described as being in the peripheral surface 6 of the rotor 3, it is to be understood that the channels 4 and 5 could be in either of the inner surface of the stator walls 11 and 12 or in the peripheral surface 6 of the rotor 3. The partitions 7 and 8 and the grooves 34 and 35 must be on the peripheral surface 6 of the rotor 3 and the blocking members 9 and 10 must be mounted on the housing 2 to permit relative movement between the partitions 7 and 8 and the blocking members 9 and 10.

It is to be understood that while I have illustrated and described one form of my invention, it is not to be limited to this specific form of arrangement of parts herein described and shown.

What I claim and desire to secure by Letters Patent is:

1. A rotary engine comprising:
   a. a stator including a housing having walls defining a generally cylindrical inner chamber, said walls each having an inner surface;
   b. a rotor rotatably mounted within said housing and having a peripheral surface in close proximity with the inner surface of said housing;
   c. a power shaft operatively connected to said rotor;

d. wall means defining a pair of circumferentially extending and laterally spaced channels in one of the inner surface of said housing and the peripheral surface of said rotor;

e. a first plurality of circumferentially spaced partitions on the peripheral surface of said rotor each defining a compression blade positioned in one of said channels to divide same into a plurality of circumferential sections;

f. a second plurality of circumferentially spaced partitions on the peripheral surface of said rotor each defining a piston member positioned in the other of said channels to divide same into a plurality of circumferential sections;

g. means mounted on said housing and extending into each of the sections of said one of said channels and cooperating with said compression blades to divide each of said respective sections into a fuel intake portion and a fuel compression portion;

h. means mounted on said housing and extending into each of the sections of said other of said channels and cooperating with said piston members to divide each of said respective sections into an ignition portion and an exhaust portion;

i. means mounted on said housing for communicating fuel into the fuel intake portion of each of the sections of said one of said channels;

j. means in said one of said rotor and said walls of said housing defining a plurality of circumferentially spaced bores each extending between the fuel compression portion of a respective one of the sections of said one of said channels and a respective ignition portion of the sections of said other of said channels;

k. wall means in said one of said rotor and said walls of said housing defining a circumferentially extending recess therein, said recess being positioned between said pair of channels and intersecting each of said bores extending between said channels;

l. a valve fin extending from the other of said rotor and said walls of said housing, said valve fin being received in said recess and in close proximity to said wall means defining said recess, said valve fin having a plurality of spaced ports therethrough each successively alignable with each of said bores during rotation of said rotor to permit flow therethrough, said fin closing each of said bores except when said ports are aligned therewith;

m. fuel ignition means mounted on said housing and communicating with the ignition portion of each of the sections of said other of said channels to ignite fuel therein whereby combustion of fuel therein acts against said piston members to effect rotation of said rotor and said power shaft; and n. exhaust flow means communicating with the exhaust portion of each of said sections of said other of said channels for permitting flow of combusted fuel therefrom in response to rotation of said rotor.

2. A rotary engine comprising:

a. a stator including a housing having a peripheral wall and opposite end walls each having an inner surface and cooperating to define an inner chamber;

b. a rotor rotatably mounted within said stator and having a peripheral surface in close proximity with the inner surface of said peripheral wall of said housing;

c. a power shaft operatively connected to said rotor;

d. wall means defining a circumferentially extending combustion channel in one of the inner surface of said peripheral wall of said housing and the peripheral surface of said rotor;

e. a plurality of circumferentially spaced partitions defining piston members on said rotor and positioned in said combustion channel to divide same into a plurality of circumferential sections;

f. means mounted on said housing and extending into each of the sections of said combustion channel and cooperating with said piston members to divide each of said respective sections into an ignition portion and an exhaust portion;

g. means for communicating fuel under pressure into the ignition portion of each of the sections of said combustion channel, said fuel communicating means comprising:

1. wall means defining a circumferentially extending fuel receiving channel in one of the inner surface of said peripheral wall of said housing and the peripheral surface of said rotor,, said fuel receiving channel being spaced from said combustion channel;

2. a second plurality of circumferentially spaced partitions defining compression blades on said rotor and positioned in said fuel receiving channel to divide same into a plurality of circumferential sections;

3. means mounted on said housing and extending into each of the sections of said fuel receiving channel and cooperating with said compression blades to divide each of said respective sections into a fuel intake portion and a fuel compression portion;

4. means mounted on said housing for communicating fuel into the fuel intake portion of each of the sections of said fuel receiving channel;

5. valve controlled flow means extending between the fuel compression portion of each section of said fuel receiving channel and the ignition portion of a respective one of the sections of said combustion channel, said valve controlled flow means comprising:

a. means defining a plurality of circumferentially spaced bores each extending between the compression portion of a respective one of the sections of said fuel receiving channel and the ignition portion of a respective one of the sections of said combustion channel;

b. wall means defining a circumferentially extending recess in one of the inner surface of said peripheral wall of said housing and the peripheral surface of said rotor, said recess intersecting each of said bores;

c. a valve fin extending from the other of the inner surface of said peripheral wall of said housing and the peripheral surface of said rotor, said valve fin being received in said recess and in close proximity to said wall means defining said recess, said valve fin having a plurality of circumferentially spaced ports therethrough and each of said ports being successively alignable with each of said bores during rotation of said rotor to permit flow therethrough, said fin closing each of said bores except when said ports are aligned therewith;

h. fuel ignition means mounted on said housing and communicating with the ignition portion of each of the sections of said combustion channel to ignite fuel therein whereby the combustion of the fuel therein acts against said piston members and effects rotation of said rotor and said power shaft; and i. exhaust flow means communicating with the exhaust portion of each of the sections of said combustion channel for permitting flow of combusted fuel therefrom in response to rotation of said rotor.

3. A rotary engine as set forth in claim 2 wherein:

a. said means to divide the sections of said combustion channel into an ignition portion and an exhaust portion comprise a plurality of circumferentially spaced blocking members each extending into a respective one of the sections of said combustion channel;

b. said rotor and each of said blocking members have cooperating means thereon for effecting relative movement between said rotor and said blocking members in response to rotation of said rotor; and c. said blocking members each have means thereon for permitting each of said blocking members to successively move over each of said piston members on said rotor whereby said piston members are each moved toward a respective one of said blocking members in the sections of said combustion channel thereby moving combusted fuel in the exhaust portion of each of the sections of said combustion channel toward and into said exhaust flow means.

4. A rotary engine as set forth in claim 3 wherein:

a. said peripheral surface of said rotor has a plurality of spaced grooves therein and aligned with said combustion channel;

b. said blocking members are each generally planar members having a peripheral edge surface having spaced ridges thereon;

c. the ridges on said blocking members are received in respective grooves in said rotor;

d. said grooves in said rotor and said ridges on said blocking members and said piston members on said rotor are arranged in corresponding spiral patterns;

e. said means on said blocking members for permitting said blocking members to move over said piston members on said rotor comprises wall means on each of said blocking members defining a path in the peripheral edge surface thereof to successively receive each of said piston members therein; and f. the path in the peripheral edge surface of each of said blocking members is arranged in a spiral pattern corresponding to the spiral pattern of said piston members to be received therein.

5. A rotary engine as set forth in claim 2 wherein:

a. said means to divide each of the sections of said combustion channel into an ignition portion and an exhaust portion and said means to divide each of the sections of said fuel receiving channel into a fuel intake portion and a fuel compression portion comprise a first and second plurality of circumferentially spaced blocking members, each plurality of blocking members being aligned with a respective one of said fuel receiving channel and said combustion channel, the blocking members of said first and second plurality of blocking members each extending into a respective one of the sections of said respective channel;

b. said rotor and each of said blocking members of each of said first and second plurality of blocking members have cooperating means thereon for effecting relative movement between said rotor and said blocking members in response to rotation of said rotor; and c. said blocking members of each of said first and second plurality of blocking members each have means thereon to permit same to successively move over each partition of said respective plurality of partitions on said rotor whereby said compression blades are each moved toward a respective one of said blocking members in the sections of said fuel receiving channel and said piston members are each moved toward a respective one of said blocking members in the sections of said combustion channel.

6. A rotary engine as set forth in claim 5 wherein:

a. said peripheral surface of said rotor has a first and second plurality of spaced grooves therein, each plurality of grooves being aligned with a respective one of said fuel receiving channel and said combustion channel;

b. said blocking members of said first and second plurality of blocking members are each generally planar members having a peripheral edge surface having spaced ridges thereon;

c. the ridges on each of said blocking members are received in respective grooves in said rotor;

d. said grooves in said rotor and said ridges on said blocking members and said partitions on said rotor are arranged in corresponding spiral patterns;

e. said means on said blocking members of said first and second plurality of blocking members for permitting same to successively move over each partition of said respective plurality of partitions on said rotor comprises wall means on each of said blocking members of said first and second plurality of blocking members defining a path in the peripheral edge surface thereof to successively receive each partition of said respective plurality of partitions therein; and f. the path in the peripheral edge surface of each of said blocking members is arranged in a spiral pattern corresponding to the spiral pattern of said respective plurality of partitions.

7. A rotary engine comprising:

a. a stator including a housing having a peripheral wall and opposite end walls each having an inner surface and cooperating to define an inner chamber, said peripheral wall having a plurality of circumferentially aligned and spaced intake ports therein;

b. a rotor rotatably mounted within said stator and having a peripheral surface in close proximity with the inner surface of said peripheral wall of said housing;

c. a power shaft operatively connected to said rotor and extending through at least one of said end walls of said housing;

d. wall means defining a pair of circumferentially extending and laterally spaced channels in the peripheral surface of said rotor, one of said channels being in alignment with said intake ports in said peripheral wall of said housing;

e. a first and second plurality of circumferentially spaced partitions on the peripheral surface of said rotor, said first plurality of partitions defining compression blades and being positioned in one of said channels to divide same into a plurality of circumferential sections, said second plurality of partitions defining piston members and being positioned in the other of said channels to divide same into a plurality of circumferential sections, the number of sections in each of said channels corresponding to the number of intake ports in said peripheral wall of said housing;

f. means mounted on said housing and extending into each of the sections of said one of the said channels and cooperating with said compression blades to divide each of said respective sections into a fuel intake portion and a fuel compression portion;

g. means mounted on said housing and extending into each of the sections of said other of said channels and cooperating with said piston members to divide each of said respective sections into an ignition portion and an exhaust portion;

h. means mounted on said housing for communicating fuel through the intake ports in said peripheral wall of said housing and into the fuel intake portion of each of the sections of said one of said channels;

i valve controlled flow means each extending between the fuel compression portion of each of the sections of said one of said channels and a respective ignition portion of the sections of said other of said channels, said valve controlled flow means comprising:

1. means on said rotor defining a plurality of circumferentially spaced bores each extending between the fuel compression portion of a respective one of the sections of said one of said channels and a respective ignition portion of the sections of said other of said channels;
  2. wall means defining a circumferentially extending recess in the peripheral surface of said rotor, said recess being positioned between said pair of channels and intersecting each of said bores extending between said channels; and
  3. a valve fin extending from the inner surface of said peripheral wall of said housing, said valve fin being received in said recess and in close proximity to said wall means defining said recess, said valve fin having a plurality of circumferentially spaced ports therethrough each successively alignable with each of said bores during rotation of said rotor to permit flow therethrough, said fin closing each of said bores except when said ports are aligned therewith;

j. fuel ignition means mounted on said housing and communicating with the ignition portion of each of the sections of said other of said channels to ignite fuel therein whereby combustion of fuel therein acts against said piston members to effect rotation of said rotor and said power shaft and thereby compression of fuel in the compression portion of each of the sections of said one of said channels by said compression blades moving toward said means to divide each of said sections of said one of said channels into a fuel intake portion and a fuel compression portion for flow through said valve controlled flow means; and k. exhaust flow means communicating with the exhaust portion of each of the sections of said other of said channels for permitting flow of combusted fuel therefrom in response to rotation of said rotor.

8. A rotary engine as set forth in claim 7 wherein:

a. said means extending into each of the sections of said one of said channels to divide same into a fuel intake portion and a fuel compression portion comprises a plurality of circumferentially spaced blocking members each extending into a respective one of the sections of said one of said channels;

b. said blocking members are each rotatably mounted on said housing;

c. said rotor and each of said blocking members have cooperating means thereon for effecting relative movement between said blocking members and said compression blades on said rotor and for effecting rotation of said blocking members in response to rotation of said rotor;

d. said blocking members each have means thereon to permit same to successively move over each of said compression blades on said rotor whereby said compression blades are each moved toward a respective one of said blocking members in the sections of said one of said channels thereby compressing fuel in the fuel compression portion of each of the sections of said one of said channels and moving the compressed fuel toward and into each of said bores of said valve controlled flow means;

e. said means extending into each of the sections of said other of said channels to divide same into an ignition portion and an exhaust portion comprises a second plurality of circumferentially spaced blocking members each extending into a respective one of the sections of said other of said channels;

f. said blocking members of said second plurality of blocking members are each rotatably mounted on said housing;

g. said rotor and each of said blocking members of said second plurality of blocking members have cooperating means thereon for effecting relative movement between said blocking members of said second plurality of blocking members and said piston members on said rotor and for effecting rotation of said respective blocking members in response to rotation of said rotor; and h. said blocking members of said second plurality of blocking members each have means thereon to permit same to successively move over each of said piston members on said rotor whereby said piston members are each moved toward a respective one of said blocking members of said second plurality of blocking members in the sections of said other of said channels thereby moving combusted fuel in the exhaust portion of each of the sections of said other of said channels toward and into said exhaust flow means.

9. A rotary engine as set forth in claim 8 wherein:

a. said wall means defining the pair of channels in the peripheral surface of said rotor each have a respective plurality of spaced grooves therein;

b. said blocking members of said first named and said second plurality of blocking members are each generally planar members having a peripheral edge surface having spaced ridges thereon;

c. the ridges on said blocking members of said first named and said second plurality of blocking members are received in the grooves in said wall means defining a respective one of said pair of channels;

d. said grooves in said wall means defining each of said pair of channels in the peripheral surface of said rotor and said ridges on said blocking members of each of said first named and said second plurality of blocking members and said first and second plurality of partitions on said rotor are arranged in corresponding spiral patterns;

e. said means on said blocking members of said first named and said second plurality of blocking members to permit same to successively move over each of said respective partitions of said first and second plurality of partitions on said rotor comprises wall means on each of said blocking members of said first named and said second plurality of blocking members defining a path in the peripheral edge surface thereof to successively receive each partition of said respective plurality of partitions therein; and f. the path in the peripheral edge surface of each of said blocking members of said first named and said second plurality of blocking members is arranged in a spiral pattern corresponding to the spiral pattern of said respective plurality of partitions.

* * * * *